United States Patent

[11] 3,612,967

[72] Inventor Marlin D. Lee
 5416 East Lee, Tucson, Ariz. 85716
[21] Appl. No. 68,211
[22] Filed Aug. 31, 1970
[45] Patented Oct. 12, 1971

[54] TWO-PHASE VIBRATING DEVICE
 7 Claims, 5 Drawing Figs.
[52] U.S. Cl. .................................................. 318/123,
 310/22, 310/25, 310/26, 310/27
[51] Int. Cl. .................................................. H02k 33/00
[50] Field of Search .................................. 318/122–132;
 310/22, 25, 26, 28, 29, 32, 33, 27, 30

[56] References Cited
UNITED STATES PATENTS
| | | | |
|---|---|---|---|
| 1,031,038 | 7/1912 | Burgess | 310/30 |
| 2,425,621 | 8/1947 | Knipper | 310/27 |
| 2,970,660 | 2/1961 | Bodine, Jr. | 310/26 |

Primary Examiner—D. F. Duggan
Attorney—Jones and Lockwood

ABSTRACT: A high-frequency vibrator for pushing pipe underground and plowing in underground cable is disclosed. An alternating electromagnetic field is established in a generally S-shaped magnetic core by connecting each of two opposing coils of the vibrator to a corresponding phase of a two phase AC electrical system, whereby one coil experiences zero current while the other coil generates a maximum magnetic field. The coils are wound on opposite ends of the S-shaped core and affect their respective ends of the core at complementary intervals. Air gaps are constructed in the core to interrupt the normal flow of flux within the core, the gaps being located on opposite sides of the core to provide the S shape. The alternate energization of the coils at complementary intervals causes first one coil and then the other to produce a magnetic flux which tends to close its corresponding airgap since these airgaps are on opposite sides of the core, first one side, then the other side of the core tends to shorten, creating a side-to-side bending motion.

PATENTED OCT 12 1971 3,612,967
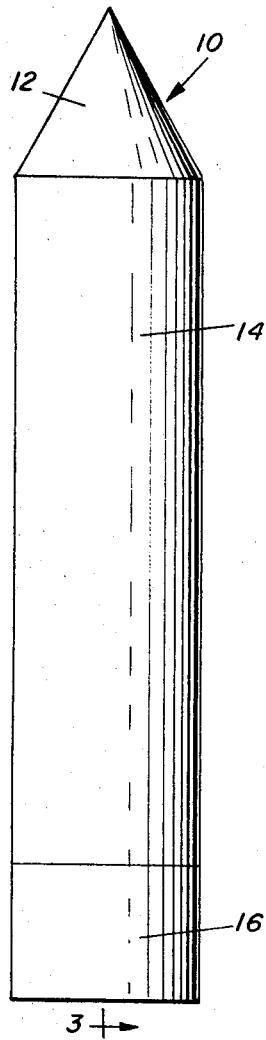
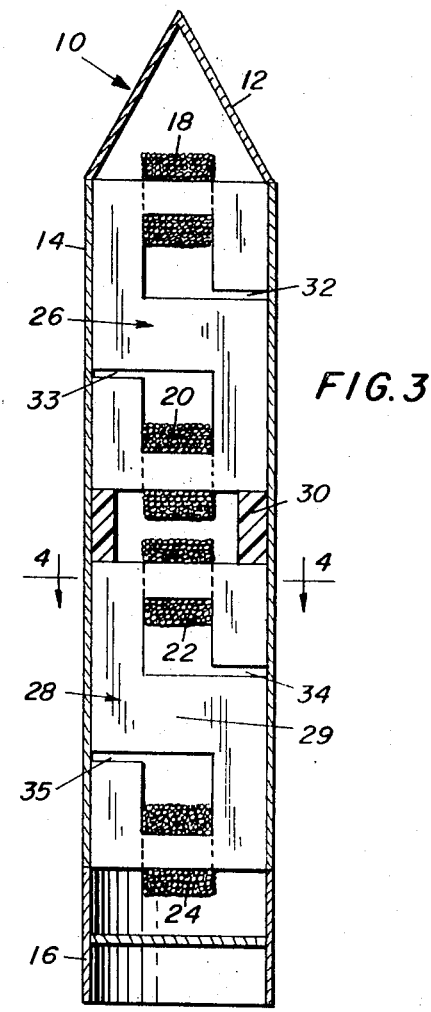
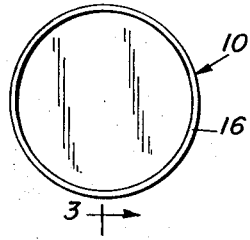
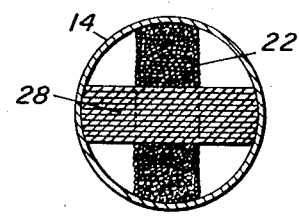
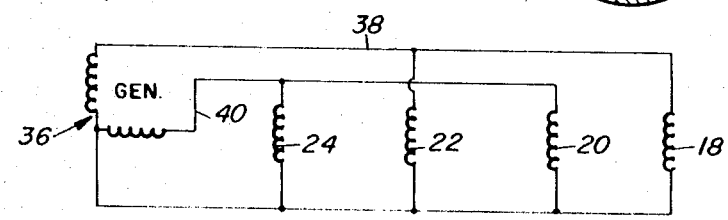
INVENTOR
MARLIN D. LEE
BY Jones and Lockwood
ATTORNEYS 3,612,967

TWO-PHASE VIBRATING DEVICE

BACKGROUND OF THE INVENTION

This invention relates, in general, to sonic cable plowing and more particularly to an electromagnetic vibrating plow for pushing or pulling cables, pipes and the like underground, such as under streets and highways.

In modern technology, it is rapidly becoming commonplace to bury electrical cables underground, both to eliminate unsightly telephone poles and to minimize malfunctions caused by electric storms and other extreme weather conditions. In the past it has been the practice to employ mechanical means, such as scoop shovels, to dig long trenches wherein the cable may be laid. This method has not been found to be totally satisfactory, however, since soil inconsistencies often require needless expenditure of time and energy. Further, such devices damage already existing surface structures such as sidewalks, driveways, and streets, as well as subsurface plumbing and other pipes.

Partially as an attempt to remedy this situation, experiments have been conducted and devices constructed in the area of sonic plowing. It has been proven that when soils are vibrated at the proper frequency, they take on the characteristics of fluids. It would seem logical therefore to impose fluid characteristics on soil which is to be removed or displaced in order to insure that this task could be accomplished with a minimum degree of difficulty. This fact has excited an understandable interest in developing the field of sonic plowing and considerable effort has been expended in this area. However, most of the effort has been directed to the mechanical and hydraulic fields which are presenting difficulties at higher frequencies required for some soil conditions.

An example of one such sonically operated cable layer can be seen in U.S. Pat. No. 3,405,533 to Fries. In the Fries patent a plow-type cable layer having a rotating eccentric weight vibrator is described. While mechanically vibrated plows have, in general, increased the speed with which furrows can be dug, they usually require the expenditure of considerable power; normally in the neighborhood of 50 hp. to plow a cable to a depth of 2 feet. Further, such devices do not overcome the problem of avoiding destruction of existing surface structures.

SUMMARY OF THE INVENTION

Accordingly, it is an object of the present invention to provide a high-frequency vibrator for driving pipes, conduits, cables, and the like underground, and which will overcome the deficiencies and difficulties of the prior art.

It is another object of the invention to provide a device which can be vibrated at a frequency sufficient to enable it to penetrate the earth with a minimum of resistance.

Another object of the invention is to provide a sonic plow which can be vibrated over a wide range of readily controllable frequencies.

Still another object of the invention is to provide an electromagnetic vibrator which does not rely on a permanent magnet or mechanical drivers as its source of operation.

Another object of the invention is to provide a vibrator structure which will effectively operate when supplied by a two-phase generator to produce an effective, easily controlled vibration at sonic frequencies.

Briefly, these and other objects and features of the invention are accomplished by setting up unbalanced, alternating magnetic fields within a vibrator shell. A two-phase generator is used to set up alternating currents that are 90° out of phase in two adjacent coils mounted on a single magnetic core. The two-phase source insures that the magnetic flux in one coil is passing through zero while the magnetic flux in its adjacent coil is at a maximum. The two coils are wound on opposite ends of an S-shaped core having two airgaps, one on each side of the core. At a given instant one of the coils is setting up a magnetic field which initiates a flux flow in its portion of the core, the field reaching a maximum when the current in the coil is a maximum and diminishing as the current in the coil moves back toward zero. While the current in the first coil is decreasing from a maximum, the current in the adjacent coil starts to increase from zero toward its maximum, setting up a magnetic field and resultant flux flow in the opposite end of the core structure. This shifting of magnetic flux from one end of the core structure to the other is used to induce a bending motion in the core by means of small airgaps in each side of the core structure. Since the flow of flux will be interrupted at the airgap, a north-south differential will be created and the core structure will bend in an attempt to close the gap. By placing these airgaps on opposite sides of the core and feeding the coils in the described phase relationship, the bending motion will be induced alternately, at opposite corners of the core. A tightly fitting shell is placed around the core so that the bending motion will be imparted to the shell and the vibratory effect created.

When it is desired to move pipes or conduits through the earth the vibrator may be constructed so as to fit over the forward end of the conduit with the generator connecting wires being fed through the center of the conduit back to the generator. A frequency capable of introducing in the soil properties approaching those of a liquid is selected and the conduit can then be pushed through the earth.

BRIEF DESCRIPTION OF THE DRAWINGS

The foregoing and additional objects, features and advantages of the present invention will be apparent to those skilled in the art from the following detailed description of a preferred embodiment, taken with the accompanying drawings, in which:

FIG. 1 is an elevation of the plow-vibrator device according to this invention;

FIG. 2 is an end view of the plow vibrator of FIG. 1;

FIG. 3 is a section view of FIG. 1 taken along line 3—3 of FIG. 2;

FIG. 4 is a section taken along line 4—4 of FIG. 3; and

FIG. 5 is a circuit diagram of the vibrator, showing the coils of FIG. 3 and their connection to the two-phase source.

DESCRIPTION OF THE PREFERRED EMBODIMENT

Referring more particularly to the drawings, in FIG. 1 and FIG. 3 the numeral 10 indicates, in general, a preferred shape and embodiment of the plow-vibrator of the present invention. The vibrator consists of a forward section 12 which is conically shaped and a main shell portion 14 which is tubular. The rear section of the vibrator includes a tail or pipe coupling section 16 adapted to fit over a conduit, pipe, or the like which is to be pushed through the earth. The pipe coupling section 16 can be more readily seen in the end-on view of FIG. 2.

FIG. 3 shows in cross section the electromagnetic components of the device of FIG. 1. The plow-vibrator has coils 18, 20, 22 and 24 wound on corresponding legs of two generally S-shaped cores 26 and 28. A nonmagnetic spacer 30, which may be attached to the tubular shell 14, separates the two core sections 26 and 28. Cores 26 and 28 are laminated (FIG. 4) and each core is symmetrical about its center with the exception of the location of airgaps 32–35. The laminations of cores 26 and 28 are of a suitably flexible material, and the cores are formed with airgaps 32, 33 and 34, 35 respectively whereby the required vibratory bending motion can be effected in the core upon the application of a current to the coils in the manner to be described.

The lines of flux created by current flowing in the coils 18, 20, 22, 24 will follow generally closed paths defined by the halves of the S-shaped cores on which each of the respective coils is wound. For example, the lines of flux generated by coil 24 will travel through the leg of core 28 on which coil 24 is wound, around through the center leg 29 of the core 28, through the gap 35, where the flow of flux is impeded, and thence back through coil 24. The cross-sectional area of the center leg 29 of the core 28 is somewhat larger than the end legs on which coils 22 and 24 are wound. This is to accommodate those periods of time when flux is being generated in the center leg by both coils 22 and 24 and thus to prevent saturation of the core.

Since the drop in magnetic potential over a flux path must be exactly balanced by the magnetic potential rise of the coil, a magnetic potential is created at the gap 35 which is equal in magnitude to the rise generated by the coil 24, assuming no other reluctance considerations along the flux path. The flow of flux in the core 28 thus sets up a magnetic differential at gaps 34 and 35 which induces a bending motion in the flexible core 28 in an attempt to close the gaps. The bending motion alternates from one gap to the other as the dominant coil varies, causing the core to bend first in one direction and then in the other. This bending motion is imparted to the surrounding vibrator shell and thus causes tip 12 to vibrate. Core 26 is substantially identical to core 28, the two cores cooperating to increase the power of the vibrations.

The number of laminations used in making the cores 26 and 28 as well as the number of turns of wire in the coils 18, 20, 22, and 24 will vary, depending on the size of vibrator which is to be constructed, but the major factors necessary to insure proper operation of the vibrator to impart the bending motion described above, are the proper location of the airgaps 32–35 and the availability of a two-phase generator to supply alternating current to the various coils in proper phase relationships.

FIG. 4 shows a cross-sectional view of the vibrator taken along the line 4—4 of FIG. 3 further illustrating the core-coil arrangement of the invention. The core shell 14 is shown with coil 22 being wound on core 28. Conventional core laminations are shown in core 28, the laminations serving to minimize eddy current flow in the core 28, in the known manner.

The schematic diagram of FIG. 5, which illustrates the electrical connection of coils 18, 20, 22 and 24 includes a two-phase power supply 36 which supplies current to the coils for the complementary production of flux in adjacent coils. The two-phase source 36 preferably is a portable rotary two-phase generator that may be moved from one work site to another. The attractive property of the two-phase generator 36 is the production of AC outputs which are always 90° out of phase. As illustrated, coils 18 and 22 are connected in parallel to one phase output of the two-phase source 36 by way of line 38, while coils 20 and 24 are connected in parallel to the remaining phase output via line 40.

Describing the operation of the vibrator, the two-phase source 36 generates a current in coils 20 and 24 via line 40, while at the same time generating a current in coils 18 and 22 via line 38 which is 90° out of phase from the current in coils 20 and 24. This means that the instantaneous current in coils 20 and 24 is always 90° out of phase from the current in coils 18 and 22. Therefore, the moment that the AC current in coils 20 and 24 is passing through zero, the current in coils 18 and 22 is at a maximum. The greater the current in a coil, the larger will be the amount of flux produced by that coil, so if coils 18 and 22 are experiencing maximum instantaneous current, each is also developing a maximum amount of flux at that time in its corresponding core.

The flow of flux developed by coil 24 follows the path described earlier to induce a magnetic differential at airgap 35, and an identical relationship exists between coil 20 and airgap 33. The greatest bending motion induced in the left-hand portion of core 28, as viewed in FIG. 3, occurs when the current in line 40 and coil 24 is at a maximum, thereby producing a maximum amount of flux differential across gap 35. Since coil 22 of core 28 is connected to output line 38 of the two-phase generator, the current in coil 22, and thus the flux differential produced by it across gap 34 is a minimum. Therefore, little or no bending motion is induced in the right-hand portion of core 28, as viewed in FIG. 3, at the time when the bending motion in the left-hand portion is a maximum. In similar manner, core 26 is flexed by the alternating fluxes induced therein by coils 18 and 20. By changing the frequency of the generator 36, the frequency of the AC current is changed. This, in turn, will change the frequency at which maximum flux is developed in the cores and the frequency of the bending motion thereof. Therefore, the frequency of the vibrator 10 is controlled by the frequency of the generator 36.

One of the advantages of using a portable two-phase generator for the present system is that frequency control of such a generator may be easily accomplished by driving it at a variable speed as by an internal combustion engine. With such an arrangement, the frequency of vibration can be changed merely by varying engine speed, without the need for complex equipment.

It can be seen from the above description and drawings that the plow-vibrator of the present invention is a simply constructed and easily manageable device which can be used to ease conduits or pipes through the earth. Further, the device provides a sonic frequency plow which does not require extremely large amounts of energy, and which can be simply controlled as to its frequency of operation. It will be recognized that numerous variations of this device can be constructed in other plow or digging devices without departing from the true spirit and scope thereof as defined in the following claims.

What is claimed is:

1. A sonic vibrator comprising:
   an outer shell;
   at least one laminated core within said outer shell;
   a two-phase electrical source;
   at least two coils wound on each said core; and
   circuit means for connecting said two-phase electrical source to said coils.

2. The vibrator of claim 1, wherein said laminated core is S-shaped and has an airgap at each end of said core preventing either end of said core from forming a completely closed loop.

3. The vibrator of claim 1, wherein said outer shell has a conically shaped tip.

4. The vibrator of claim 1, wherein said outer shell has a section adapted to engage tubular objects.

5. The vibrator of claim 1, wherein said outer shell has a nonmagnetic spacer to prevent longitudinal movement of said laminated core within said shell.

6. The vibrator of claim 2, wherein said circuit means includes a conductor connecting one phase of the output from said two-phase electrical source to one of said coils on each said core, the coil adjacent thereto being connected to the second phase of the output from said two-phase electrical source via a second conductor.

7. The vibrator of claim 6, wherein said coils are wound on opposite ends of said S-shaped core to produce separate flux paths in said core including said airgaps, said first and second phase outputs producing a maximum flux in their respective coils at complementary intervals.